United States Patent
Fujioka et al.

(10) Patent No.: US 12,351,048 B2
(45) Date of Patent: Jul. 8, 2025

(54) BATTERY CHARGING CONTROL DEVICE FOR VEHICLE

(71) Applicant: Mazda Motor Corporation, Hiroshima (JP)

(72) Inventors: Shinya Fujioka, Aki-gun (JP); Masahiro Doi, Aki-gun (JP); Yuki Ida, Aki-gun (JP); Hirotaka Sugie, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 499 days.

(21) Appl. No.: 17/944,002

(22) Filed: Sep. 13, 2022

(65) Prior Publication Data

US 2023/0131093 A1   Apr. 27, 2023

(30) Foreign Application Priority Data

Oct. 25, 2021   (JP) .................. 2021-173698

(51) Int. Cl.
*H02J 7/00* (2006.01)
*B60L 3/00* (2019.01)
(Continued)

(52) U.S. Cl.
CPC ............. *B60L 53/14* (2019.02); *B60L 3/0046* (2013.01); *B60L 53/11* (2019.02); *B60L 53/305* (2019.02);
(Continued)

(58) Field of Classification Search
CPC ........ B60L 53/14; B60L 53/11; B60L 53/305; B60L 53/62; B60L 53/66; B60L 3/0046;
(Continued)

(56) References Cited

U.S. PATENT DOCUMENTS

| 6,275,001 B1 * | 8/2001 | Dierker ............... F02N 11/0866 320/103 |
| 2016/0172897 A1 * | 6/2016 | Iisaka ................... H02J 7/1469 320/107 |
| 2022/0194238 A1 * | 6/2022 | Jang ........................ B60L 58/12 |

FOREIGN PATENT DOCUMENTS

JP    2006174619 A    6/2006

* cited by examiner

*Primary Examiner* — Zixuan Zhou
(74) *Attorney, Agent, or Firm* — Alleman Hall & Tuttle LLP

(57) ABSTRACT

A battery charging control device for a vehicle is provided, which includes a motor, a high-voltage battery, a low-voltage battery, a charging connecting device, an auxiliary charging device, a temporary storage device, a storage device, a write processing device which performs write processing for writing and storing in the storage device information stored in the temporary storage device, and a control device which includes a determination module and a charging control module. The control module suspends the auxiliary charging device after causing the write processing device to perform the write processing, when an auxiliary charging ending condition is satisfied without an external charging starting condition being satisfied, and issues an external charging start command to a charger after suspending the auxiliary charging device and inhibits the write processing by the write processing device, when the auxiliary charging ending condition is satisfied by the external charging starting condition being satisfied.

14 Claims, 10 Drawing Sheets

(51) Int. Cl.
*B60L 53/10* (2019.01)
*B60L 53/14* (2019.01)
*B60L 53/30* (2019.01)
*B60L 53/62* (2019.01)
*B60L 53/66* (2019.01)
*B60L 58/20* (2019.01)
*H02J 1/08* (2006.01)
*H02J 7/14* (2006.01)
*H02J 7/34* (2006.01)

(52) U.S. Cl.
CPC ............... *B60L 53/62* (2019.02); *B60L 53/66* (2019.02); *B60L 58/20* (2019.02); *H02J 1/082* (2020.01); *H02J 7/0013* (2013.01); *H02J 7/0048* (2020.01); *H02J 7/1423* (2013.01); *H02J 7/342* (2020.01)

(58) Field of Classification Search
CPC ......... B60L 58/20; H02J 1/082; H02J 7/0013; H02J 7/0048; H02J 7/1423; H02J 7/342
USPC .................................... 320/103, 109; 701/22
See application file for complete search history.

BATTERY CHARGING CONTROL DEVICE FOR VEHICLE

TECHNICAL FIELD

The present disclosure relates to a battery charging control device for a vehicle, which includes a motor as a driving source, a high-voltage battery which supplies power to the motor, a low-voltage battery of which the output voltage is lower than the high-voltage battery, and a charging connection device which realizes external charging for charging the high-voltage battery by a power unit having a charger provided outside the vehicle, by being connected with the power unit.

BACKGROUND ART

Conventionally, vehicles provided with a motor as a driving source carry a high-voltage battery and a low-voltage battery of which the output voltage is lower than the high-voltage battery. The high-voltage battery supplies power to the motor, and the low-voltage battery supplies power to apparatuses, such as controllers and audio devices. For example, JP2006-174619A discloses a vehicle including a motor generator as a driving source, a high-voltage battery (a main battery in JP2006-174619A) which supplies power to the motor generator, and a low-voltage battery (an auxiliary battery in JP2006-174619A) of which the output voltage is lower than the high-voltage battery. The vehicle is configured so that the low-voltage battery is charged by the high-voltage battery for every fixed time after an ignition switch is turned off.

Further, it is conventionally known that some of the vehicles provided with the motor as the driving source and the high-voltage battery which supplies power to the motor can realize external charging in which the high-voltage battery is charged by a power unit outside the vehicle by using a charger outside the vehicle.

In the vehicles which carry the motor as the driving source, the high-voltage battery and the low-voltage battery, if both auxiliary charging for charging the low-voltage battery by the high-voltage battery and the above-described external charging are enabled, the charged amounts of both the high-voltage battery and the low-voltage battery can be secured.

However, if simply a control sequence for the auxiliary charging and a control sequence for the external charging are established, and these control sequences are configured to be executed, the control sequence for the auxiliary charging may interfere with the control sequence for the external charging when a condition for starting the external charging is satisfied during the execution of the auxiliary charging, and the auxiliary charging or the external charging may not be executed appropriately. Thus, when the condition for starting the external charging is satisfied during the execution of the auxiliary charging, it is desirable to first end the auxiliary charging and to then start the external charging. On the other hand, when the condition for starting the external charging is satisfied by a user operating the charger outside the vehicle, the user may feel odd if a period of time from the above-described operation being performed to the external charging being started becomes long. Therefore, when the condition for starting the external charging is satisfied during the execution of the auxiliary charging, it is desired to prevent that the above-described period of time until the external charging is started becomes long, while ending the auxiliary charging and then starting the external charging.

SUMMARY OF THE DISCLOSURE

The present disclosure is made in view of the above situations, and one purpose thereof is to provide a battery charging control device for a vehicle, capable of preventing that a period of time until external charging is started becomes long, while enabling auxiliary charging and the external charging.

Regarding the above problems, the present inventors focused on a control sequence for ending the auxiliary charging. When ending the auxiliary charging, an auxiliary charging device which realizes the auxiliary charging is suspended. Here, information on the auxiliary charging device, such as a failure, can be acquired only during the operation of the auxiliary charging device. Thus, when the auxiliary charging device is suspended, it is necessary to write the information on the auxiliary charging device from a device which stores the information only during the operation of the auxiliary charging device to a device which can store the information even after the suspension of the auxiliary charging device. However, the present inventors found that such a write processing takes a comparatively long period of time and that execution of the write processing is a main cause of the delay in starting the external charging when the auxiliary charging is ended and then the external charging is started. Based on the findings, the present inventors made a battery charging control device for a vehicle as described below.

That is, the present disclosure is a battery charging control device for a vehicle, which includes a motor as a driving source, a high-voltage battery configured to supply power to the motor, a low-voltage battery of which an output voltage is lower than the high-voltage battery, a charging connection device configured to realize external charging for charging the high-voltage battery by a power unit having a charger provided outside the vehicle, by being connected with the power unit, an auxiliary charging device configured to carry out auxiliary charging for charging the low-voltage battery by output power of the high-voltage battery, a temporary storage device configured to store information on the auxiliary charging device only during operation of the auxiliary charging device, a storage device configured to store the information on the auxiliary charging device both during operation and suspension of the auxiliary charging device, a write processing device configured to carry out write processing for writing and storing in the storage device the information stored in the temporary storage device, and a control device configured to control the auxiliary charging device and the write processing device. The control device includes a processor configured to execute a determination module to determine whether an external charging starting condition that is a condition for starting the external charging is satisfied, and when the external charging starting condition is satisfied or other given conditions are satisfied during execution of the auxiliary charging, determine that an auxiliary charging ending condition that is a condition for ending the auxiliary charging is satisfied, and a charging control module to suspend the auxiliary charging device after causing the write processing device to carry out the write processing, when the auxiliary charging ending condition is satisfied in a state where the external charging starting condition is not satisfied, and issue a command for starting the external charging to the charger after suspending the auxiliary charging device and inhibit the write processing by the write processing device, when the auxiliary charging ending condition is satisfied in connection with the establishment of the external charging starting condition.

According to this device, the external charging for charging the high-voltage battery by the power unit outside the vehicle and the auxiliary charging for charging the low-voltage battery by the output power of the high-voltage battery are realized. Therefore, the charged amounts of both the high-voltage battery and the low-voltage battery can be secured.

Further, when the auxiliary charging ending condition is satisfied in the state where the external charging starting condition is not satisfied, the auxiliary charging device is suspended after the information on the auxiliary charging device is written in the storage device which can store the information even after the suspension of the auxiliary charging device, and therefore, the above-described information can be continuously held even after the suspension of the auxiliary charging.

On the other hand, when the auxiliary charging ending condition is satisfied in connection with the establishment of the external charging starting condition, the auxiliary charging device is suspended and the auxiliary charging is ended without the execution of the write processing. Thus, while suppressing that the control sequence for carrying out the auxiliary charging interferes with the control sequence for starting the external charging, the start time of the external charging can be prevented from becoming late because of the time for the write processing. Therefore, the external charging can be started earlier, while appropriately starting the external charging.

The charging control module may carry out an auxiliary charging post stop control for erasing and updating information held by the control device after the suspension of the auxiliary charging device, when the auxiliary charging ending condition is satisfied. The charging control module may issue a command for causing the charger to start the external charging after the auxiliary charging post stop control is finished, when the external charging starting condition is satisfied during the execution of the auxiliary charging.

According to this configuration, when the auxiliary charging ending condition is satisfied, the erasing and updating of the information held by the control device are carried out. Thus, regardless of whether the external charging starting condition is satisfied, the control device can be updated by utilizing the timing at which the auxiliary charging is ended. Here, if the external charging is started after the execution of the information erase control and the update control, the start time of the external charging becomes late because of the time for executing these controls. On the other hand, according to the present disclosure, as described above, by the write processing being omitted when the auxiliary charging ending condition is satisfied in connection with the establishment of the external charging starting condition, the delay in the start time of the external charging is suppressed. Therefore, also in the case where the auxiliary charging ending condition is satisfied in connection with the establishment of the external charging starting condition, the start time of the external charging can be prevented from becoming excessively late, while updating the control device.

The battery charging control device may include a main contactor configured to engage and disengage an electric connection between a high-voltage circuit including the low-voltage battery and the high-voltage battery, and an output driver configured to output to the main contactor a forcible open command that is a command for forcibly opening the main contactor. The charging control module may determine whether the forcible open command is outputted from the output driver during the execution of the auxiliary charging post stop control.

According to this configuration, by utilizing the auxiliary charging ending timing, it can be determined whether the forcible open command may be outputted (i.e., whether the main contactor may be forcibly opened to forcibly cut off the electric connection between the high-voltage circuit and the high-voltage batter). According to the present disclosure, when the auxiliary charging ending condition is satisfied in connection with the establishment of the external charging starting condition, the delay in the start time of the external charging is suppressed by omitting the write processing, as described above. Therefore, also when the auxiliary charging ending condition is satisfied in connection with the establishment of the external charging starting condition, the start time of the external charging can be prevented from becoming excessively late, while performing the above-described determination.

The battery charging control device may include a main contactor configured to engage and disengage an electric connection between a high-voltage circuit including the low-voltage battery and the high-voltage battery. The charging control module may open the main contactor, when the auxiliary charging ending condition is satisfied. The charging control module may close the main contactor and start the auxiliary charging device to start the auxiliary charging, when the external charging starting condition is satisfied. The charging control module may close the main contactor and start the auxiliary charging device, after opening the main contactor and suspending the auxiliary charging device, when the external charging starting condition is satisfied during the execution of the auxiliary charging.

According to this configuration, when the external charging starting condition is satisfied, the main contactor is closed and the auxiliary charging device is started to start the auxiliary charging. That is, the auxiliary charging is also carried out during the execution of the external charging. Therefore, more charged amounts of both the high-voltage battery and the low-voltage battery can be secured.

Further, according to this configuration, when the external charging starting condition is satisfied during the execution of the auxiliary charging, after the main contactor is opened and the auxiliary charging device is suspended, the main contactor is closed and the auxiliary charging device is started. Thus, it can be prevented that the control for opening the main contactor and suspending the auxiliary charging device, which is carried out in connection with the end of the auxiliary charging, interferes with the control for closing the main contactor and starting the auxiliary charging device, which is carried out in connection with the start of the external charging.

The battery charging control device may include a state of charge (SOC) calculation device configured to calculate a battery SOC that is a SOC of the high-voltage battery. The charging control module may receive information on the latest battery SOC from the SOC calculation device during the execution of the auxiliary charging post stop control.

According to this configuration, the latest battery SOC calculated by the SOC calculation device can be received by the control device (the charging control module) by utilizing the timing at which the auxiliary charging is ended. Thus, in the case where the external charging is started after ending the auxiliary charging, it becomes possible to appropriately control the charger by using the latest battery SOC. Further, according to the present disclosure, when the auxiliary charging ending condition is satisfied in connection with the establishment of the external charging starting condition, the delay of the start time of the external charging is suppressed by omitting the write processing, as described above. Thus, also when the auxiliary charging ending condition is satisfied in connection with the establishment of the external charging starting condition, the start time of the external charging can be prevented from becoming excessively late, while causing the control device (charging control module) to receive the latest battery SOC.

The charging control module may determine that the auxiliary charging post stop control is finished, when a given reference period of time passes after the suspension of the auxiliary charging device. The charging control module may issue a command for causing the charger to start the external charging after determining that the auxiliary charging post stop control is finished, when the external charging starting condition is satisfied during the execution of the auxiliary charging.

According to this configuration, the external charging can be started after the auxiliary charging post stop control is surely finished.

The battery charging control device may include a plurality of controller area network (CAN) communication apparatuses including the charger configured to be capable of CAN communications with the control device. The charging control module may carry out an information erase control for erasing information including signals for realizing the CAN communications between the control device and the CAN communication apparatuses after the suspension of the auxiliary charging device, when the auxiliary charging ending condition is satisfied, and carry out an update control for updating the erased information. The charging control module may generate a signal for realizing the CAN communications between the control device and the charger and transmit the signal to the charger, and issue a command for causing the charger to start the external charging, after the information erase control is finished and before the update control is finished, when the external charging starting condition is satisfied during the execution of the auxiliary charging.

According to this configuration, a part of the information of the control device can be erased and updated by utilizing the auxiliary charging end timing. Further, in this configuration, when the external charging starting condition is satisfied during the execution of the auxiliary charging, the generation and transmission for realizing the CAN communications between the control device and the charger are carried out to start the CAN communications, after the finish of the information erase control and before the finish of the update control. That is, the CAN communications between the control device and the charger are started without waiting until other information is updated by the update control. Therefore, the external charging can be started earlier, while transmitting the information necessary for the external charging from the control device to the charger to realize the external charging appropriately.

DETAILED DESCRIPTION OF THE DISCLOSURE (Overall Configuration of Vehicle)

Figure 1:
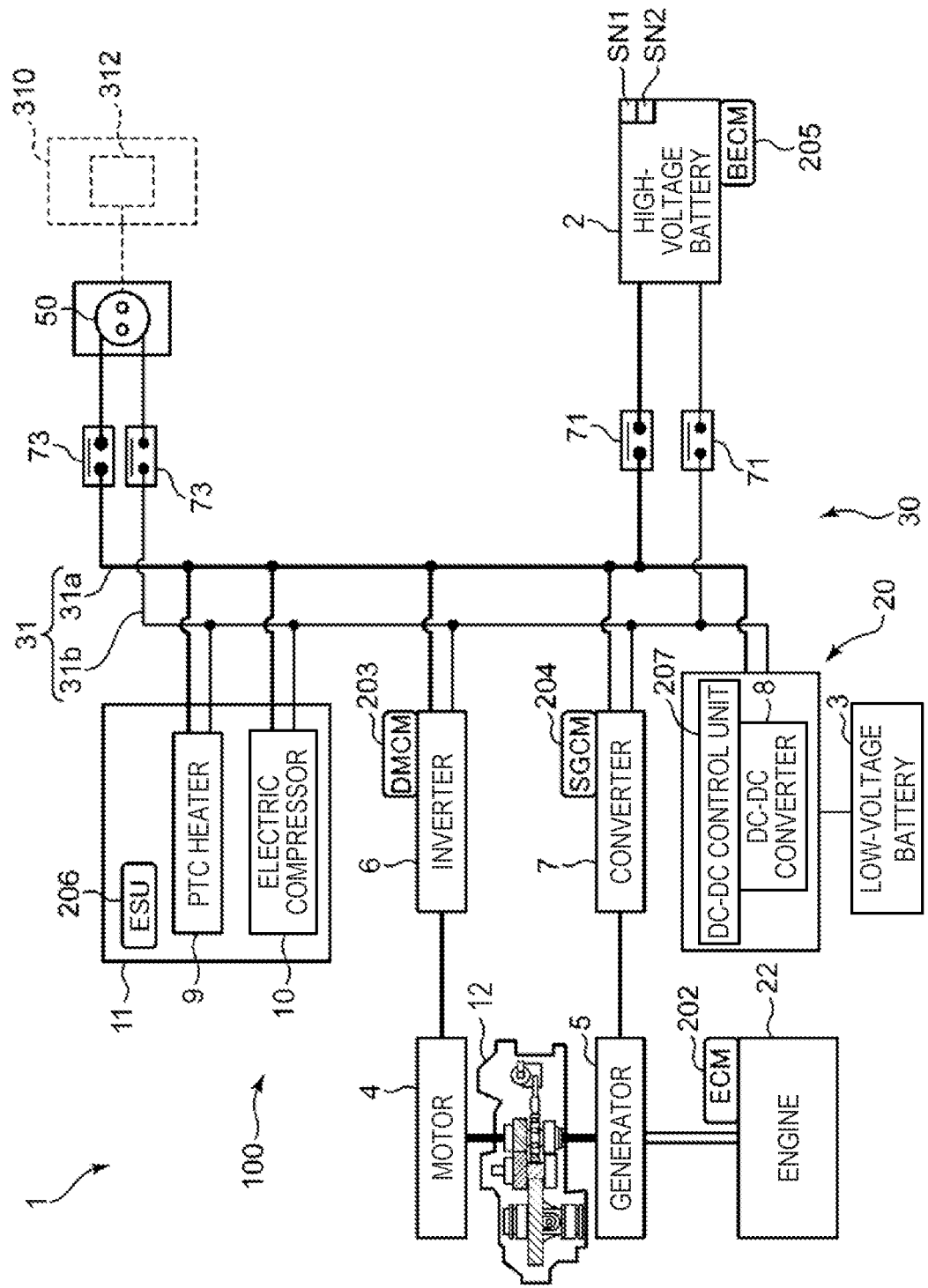
FIG. 1 is a view schematically illustrating a configuration of a vehicle on which a battery charging control device for the vehicle according to one embodiment of the present disclosure is mounted.

A battery charging control device for a vehicle according to a first embodiment of the present disclosure is described. FIG. 1 is a view schematically illustrating a configuration of a vehicle 1 on which a battery charging control device 100 according to the first embodiment is mounted. The vehicle 1 is a four-wheeled vehicle, for example.

The vehicle 1 (battery charging control device 100) includes a high-voltage battery 2, a low-voltage battery 3 of which the output voltage is lower than the high-voltage battery 2, a high-voltage circuit 30 which has a plurality of electric apparatuses and is electrically connected to the high-voltage battery 2, and a charging connection device 50. Further, the vehicle 1 has a plurality of controllers for controlling each part of the vehicle 1, such as microcomputers.

(Batteries)

In the first embodiment, a Li battery (lithium battery) is mounted on the vehicle 1 as the high-voltage battery 2. For example, the high-voltage battery 2 has a plurality of battery modules, each comprised of 12 battery cells which are connected in 2 groups in parallel of 6 battery cells in series, and is constituted by connecting these battery modules in series. Further, in the first embodiment, a lead battery is mounted on the vehicle 1 as the low-voltage battery 3. For example, the nominal voltage of the high-voltage battery 2 is 24V, and the nominal voltage of the low-voltage battery 3 is 12V.

The high-voltage battery 2 is provided with sensing devices, such as a battery current sensor SN1 which detects current of the high-voltage battery 2, and a battery temperature sensor SN2 which detects a temperature of the high-voltage battery 2. Further, although illustration is omitted, the high-voltage battery 2 is provided with a battery heater for heating the battery modules.

(High-Voltage Circuit)

The high-voltage circuit 30 includes, as the electric apparatuses, a motor 4, a generator 5, an inverter 6, a converter 7, a DC-DC converter 8, a positive temperature coefficient (PTC) heater 9, and an electric compressor 10. Further, the high-voltage circuit 30 includes a high-voltage line 31 which connects between these electric apparatuses.

The inverter 6, the converter 7, the DC-DC converter 8, the PTC heater 9, and the electric compressor 10 are each connected to the high-voltage line 31. The motor 4 is connected to the high-voltage line 31 via the inverter 6. The generator 5 is connected to the high-voltage line 31 via the converter 7.

The motor 4 rotates in response to power supply from the high-voltage battery 2. The motor 4 is mounted on the vehicle 1 as a driving source of the vehicle 1, and the output of the motor 4 is transmitted to wheels (not illustrated) via a driving force transmission device 12.

The generator 5 is a power generating device for charging the high-voltage battery 2. The vehicle 1 of the first embodiment is a series-type hybrid vehicle. That is, an engine 22 which drives the generator 5 is mounted on the vehicle 1, and the generator 5 is rotated by the engine 22 to generate power, and the power generated by the generator 5 is supplied to the high-voltage battery 2. The engine 22 is a rotary engine, for example. Note that the generator 5 is connected also with the wheels via the driving force transmission device 12, and the vehicle 1 can retrieve energy when the vehicle slows down (regeneration).

The inverter 6 is a device which converts direct current into alternate current, and converts direct current from the high-voltage battery 2 into alternate current and supplies it to the motor 4. The converter 7 is a device which converts alternate current into direct current, and converts the alternate current generated by the generator 5 into direct current and supplies it to the high-voltage battery 2.

The DC-DC converter 8 is a device which lowers the voltage of input power and outputs it. The vehicle 1 is capable of carrying out auxiliary charging for charging the low-voltage battery 3 by the output voltage of the high-voltage battery 2, and the DC-DC converter 8 is incorporated into the high-voltage circuit 30 so that the output voltage of the high-voltage battery 2 is lowered and supplied to the low-voltage battery 3.

The PTC heater 9 and the electric compressor 10 constitute a cooling-and-heating device 11 of the vehicle 1. In detail, the PTC heater 9 is a device which heats a cabin of the vehicle 1, and the electric compressor 10 is a device which cools the cabin of the vehicle 1. Note that, in the first embodiment, a cooling plate (not illustrated) for cooling the high-voltage battery 2 is provided, and the electric compressor 10 also cools the cooling plate.

(Main Contactor)

Between the high-voltage battery 2 and the high-voltage circuit 30, a pair of main contactors 71 are provided. The main contactors 71 are contactors (i.e., electromagnetic switches each including an electromagnet), and are devices each of which engages and disengages an electric connection between two points of contact according to the power supplied. When the contactor is closed, the two points of contact are connected and become in an electrically conducting state, and when the contactor is opened, the two points of contact are disconnected and become in an electrically non-conducting state. The main contactors 71 engage and disengage the electric connection between the high-voltage battery 2 and the high-voltage circuit 30. In detail, one of the main contactors 71 engages and disengages the electric connection between a line on the positive electrode side of the high-voltage battery 2 and a line on the positive electrode side of the high-voltage circuit 30, and the other main contactor 71 engages and disengages the electric connection between a line on the negative electrode side of the high-voltage battery 2 and a line on the negative electrode side of the high-voltage circuit 30.

(Charging Connecting Device)

The charging connection device 50 is a device which electrically connects a power unit 310 having a charger 312 provided outside the vehicle to the high-voltage battery 2 by being connected with the power unit 310. By electrically connecting the power unit 310 with the high-voltage battery 2 via the charging connection device 50, the external charging for charging the high-voltage battery 2 by the power unit 310 is realized. Switching between start and suspension of the external charging (i.e., between output and stop of power from the power unit 310 toward the high-voltage battery 2), and adjustment of current outputted from the power unit 310 to the high-voltage battery 2 are carried out by the charger 312 of the power unit 310. In this embodiment, the power unit 310 is a direct-current power supply. Below, the charging connection device 50 is referred to as "the DC charging connection device 50," the power unit 310 to which the DC charging connection device 50 is connected is referred to as "the DC power unit 310," and the charger of the DC power unit 310 is referred to as "the DC charger 312."

The DC charging connection device 50 is configured to fit with a connector (hereinafter, referred to as "the DC connector") provided to an end of a cable connected to the DC charger 312 (the DC power unit 310), and by this fitting, the DC charger 312 (the DC power unit 310) is electrically connected to the high-voltage battery 2.

The DC charging connection device 50 is connected with the DC charger 312 (the DC power unit 310) by a power supply line, and is connected also by a CAN-BUS. The DC charging connection device 50 is connected to a C-BCM 200 (described later) through the CAN-BUS, and by the fitting of the DC charging connection device 50 with the DC connector, the C-BCM 200 is connected with the DC charger 312 (the DC power unit 310) so as to be capable of CAN communications.

Between the DC charging connection device 50 and the high-voltage circuit 30, on-board charging (OBC) contactors 73 which are contactors which engage and disengage an electric connection between the DC charging connection device 50 and the high-voltage circuit 30 are provided, and the DC charging connection device 50 is electrically connected to the high-voltage battery 2 via the OBC contactors 73, the high-voltage circuit 30, and the main contactors 71. Note that one of the OBC contactors 73 engages and disengages the electric connection between a line on the positive electrode side of the high-voltage circuit 30 and a line on the positive electrode side of the DC charging connection device 50, and the other OBC contactor 73 engages and disengages the electric connection between a line on the negative electrode side of the high-voltage circuit 30 and a line on the negative electrode side of the DC charging connection device 50.

(Controllers)

Figure 2:
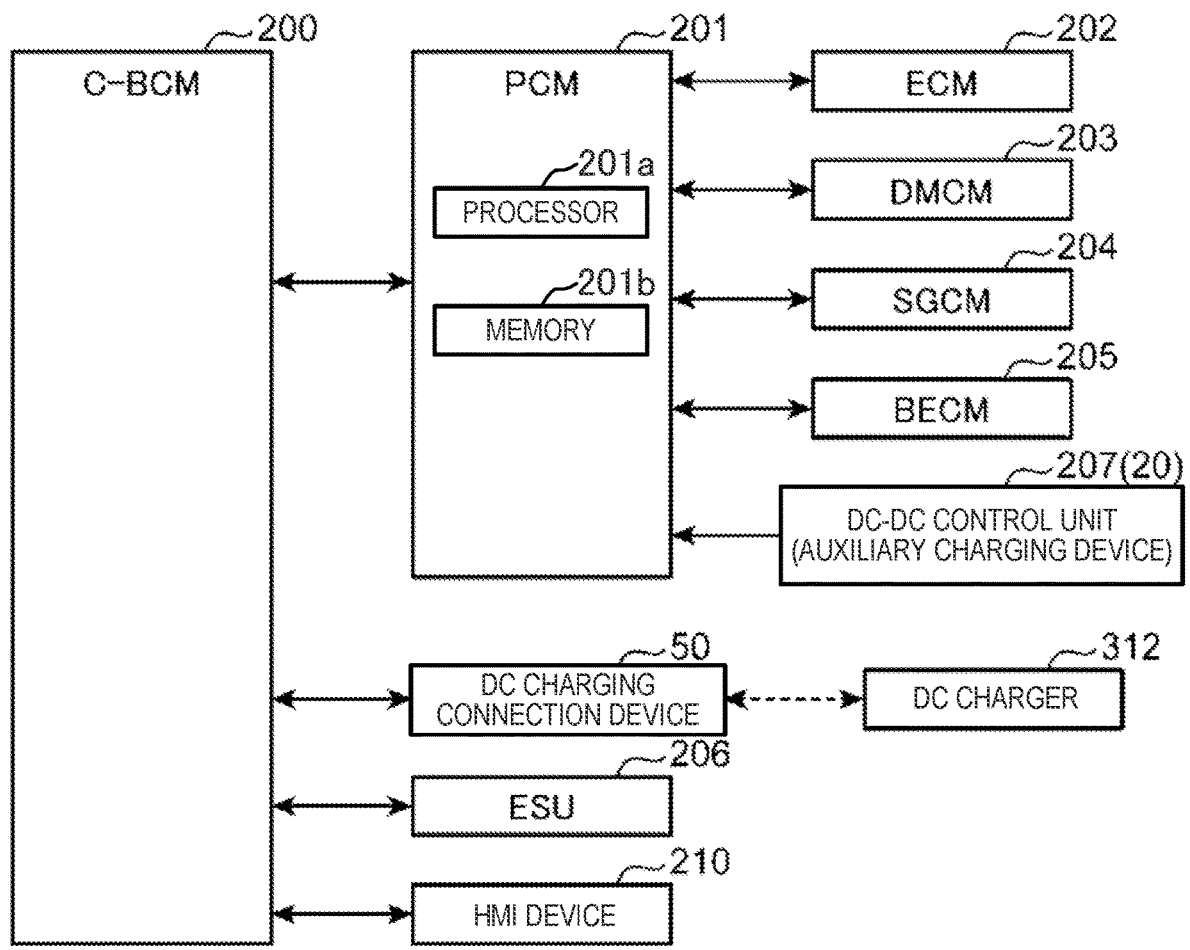
FIG. 2 is a block diagram illustrating a relationship between controllers.

FIG. 2 is a block diagram illustrating a relationship between the controllers mounted on the vehicle 1. On the vehicle 1, as the controllers, the C-BCM (Center-Body Control Module) 200, a PCM (Power Control Module) 201, an ECM (Engine Control Module) 202, a DMCM (Driver Motor Control Module) 203, an SGCM (Starter Generator Control Module) 204, a BECM (Battery Energy Control Module) 205, an ESU (Electric Supply Unit) 206, and a DC/DC control unit 207 are mounted. Further, on the vehicle 1, an HMI (Human Machine Interface) device 210 which is a device which includes a display and displays a variety of information is mounted. The above-described PCM 201 is an example of a "control device" of the present disclosure, and the BECM 205 is an example of a "state of charge (SOC) calculation device" of the present disclosure. The PCM 201 includes memory 201b to store various software modules and a processor 201a configured to execute the software modules to achieve their respective functions.

The C-BCM 200 mainly controls doors and windows. The PCM 201 mainly controls drive-system devices of the vehicle 1. The ECM 202 mainly controls the engine 22. The DMCM 203 controls the inverter 6. The SGCM 204 controls the converter 7. The ESU 206 controls the cooling-and-heating device 11.

The DC/DC control unit 207 controls the DC-DC converter 8. The DC-DC converter 8 and the DC/DC control unit 207 which controls the DC-DC converter 8 constitute an auxiliary charging device 20 which realizes the auxiliary charging for charging the low-voltage battery 3 by the output voltage of the high-voltage battery 2.

The BECM 205 carries out various calculations related to the high-voltage battery 2. In detail, when the main contactors 71 are switched from the closed state to the open state so that the electric connection between the high-voltage battery 2 and the high-voltage circuit 30 is cut off, the BECM 205 calculates an initial value of a battery SOC which is a SOC of the high-voltage battery 2 based on detection values of the battery current sensor SN1 and the battery temperature sensor SN2. The BECM 205 also calculates an amount of increase or decrease of the battery SOC per unit time based on the detection values, until the main contactors 71 are switched back to the closed state from the open state, and updates the battery SOC by integrating the amount of increase or decrease to the initial value. Further, the BECM 205 performs a failure determination of the high-voltage battery 2, the battery current sensor SN1, and the battery temperature sensor SN2.

Each of the controllers 200-207 operates in response to power from the low-voltage battery 3. The controllers 200-207 are connected through the CAN-BUS so that they are capable of the CAN (Controller Area Network) communications with each other.

Figure 3:
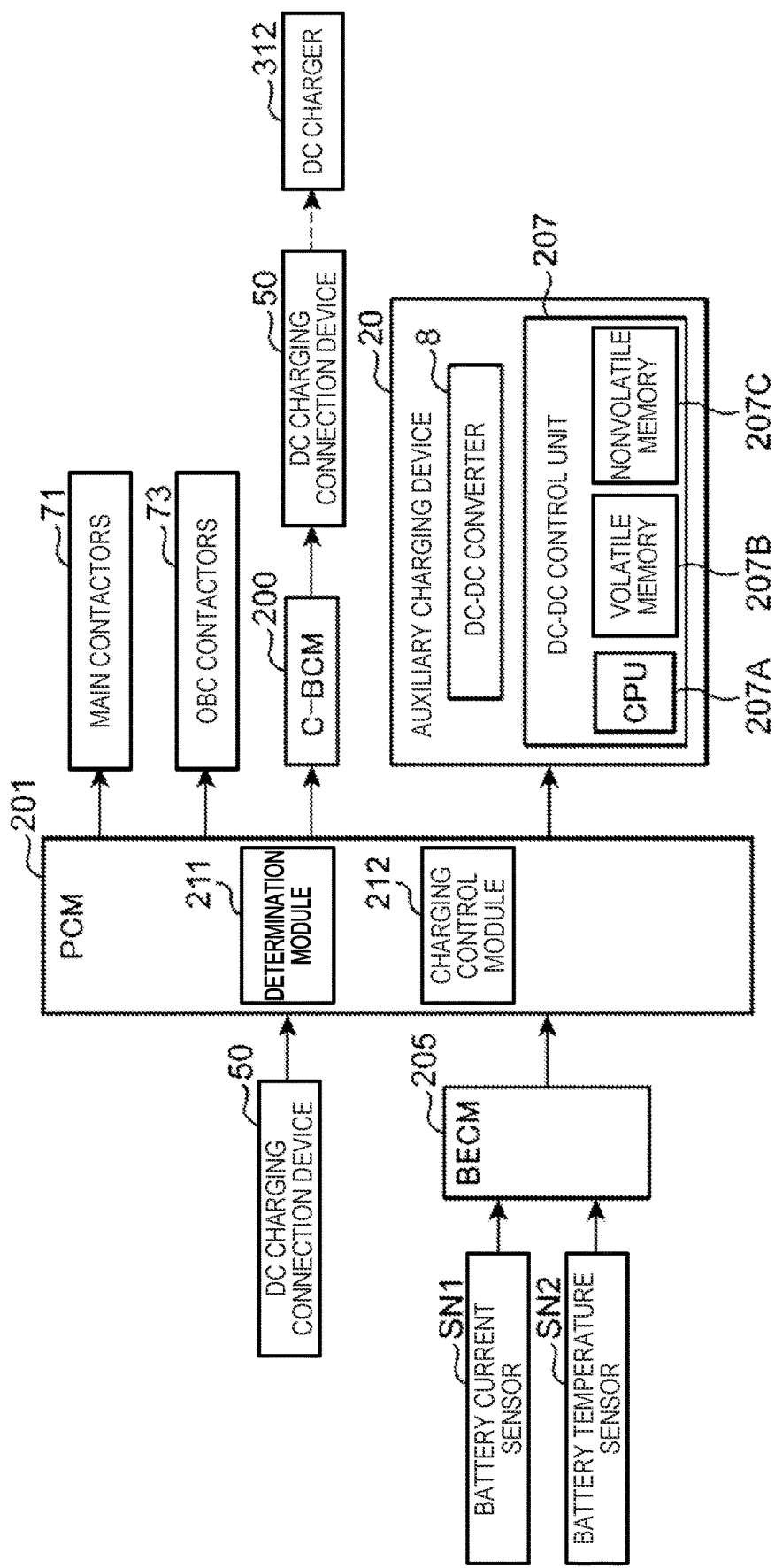
FIG. 3 is a control block diagram illustrating an auxiliary charging end control and an external charging start control.

As illustrated in FIG. 3 which will be described later, at least the DC/DC control unit 207 among the controllers includes a CPU (Central Processing Unit) 207A, a volatile memory 207B which can store information only while the power is supplied (i.e., only during the operation of the auxiliary charging device 20 including the DC/DC control unit 207), and nonvolatile memory 207C which can store information even when the power supply is stopped (i.e., both during the operation and suspension of the auxiliary charging device 20 including the DC/DC control unit 207). The CPU 207A of the DC/DC control unit 207 is an example of a "write processing device" of the present disclosure, the volatile memory 207B is an example of a "temporary storage device" of the present disclosure, and the nonvolatile memory 207C is an example of a "storage device" of the present disclosure.

(Charge Controls)

Controls related to the external charging and the auxiliary charging are mainly carried out by the PCM 201. FIG. 3 is a control block diagram of these controls. The PCM 201 includes a determination module 211 which determines whether an external charging starting condition which is a condition for starting the external charging is satisfied, and whether an auxiliary charging ending condition which is a condition for ending the auxiliary charging is satisfied, and a charging control module 212 which carries out an external charging start control for starting the external charging, and an auxiliary charging end control for ending the auxiliary charging. These modules are stored as software in the memory 201b.

As illustrated in FIG. 3, the PCM 201 is electrically connected with the DC charging connection device 50, and a signal from the DC charging connection device 50 is inputted into the PCM 201. Further, by the CAN communications, the battery SOC calculated by the BECM 205, and the detection values of the battery current sensor SN1 and the battery temperature sensor SN2 inputted into the BECM 205 are inputted into the PCM 201 from the BECM 205.

The PCM 201 is electrically connected with the main contactors 71 and the OBC contactors 73, and opens and closes the main contactors 71 and the OBC contactors 73. In detail, the PCM 201 opens and closes the contactors 71 and 73 by switching between supply and suspension of the power from the low-voltage battery 3 to the contactors 71 and 73, respectively.

The PCM 201 is electrically connected with the auxiliary charging device 20, and switches between start (activation) and suspension of the auxiliary charging device 20 (the DC/DC control unit 207 and the DC-DC converter 8). In detail, the auxiliary charging device 20 is configured to be started (activated) by power being supplied from the low-voltage battery 3, and the PCM 201 switches between supply and suspension of the power to the auxiliary charging device 20 from the low-voltage battery 3.

The PCM 201 carries out the CAN communications with the DC charger 312 via the C-BCM 200 and the DC charging connection device 50. Further, as illustrated in FIG. 2, the PCM 201 carries out the CAN communications also with the ECM 202, the DMCM 203, the SGCM 204, the BECM 205, and the DC/DC control unit 207 (the auxiliary charging device 20). That is, the C-BCM 200, the DC charger 312, the ECM 202, the DMCM 203, the SGCM 204, the BECM 205, and the DC/DC control unit 207 (the auxiliary charging device 20) are CAN communication apparatuses which carry out the CAN communications with the PCM 201.

(External Charging Start Control)

Figure 4:
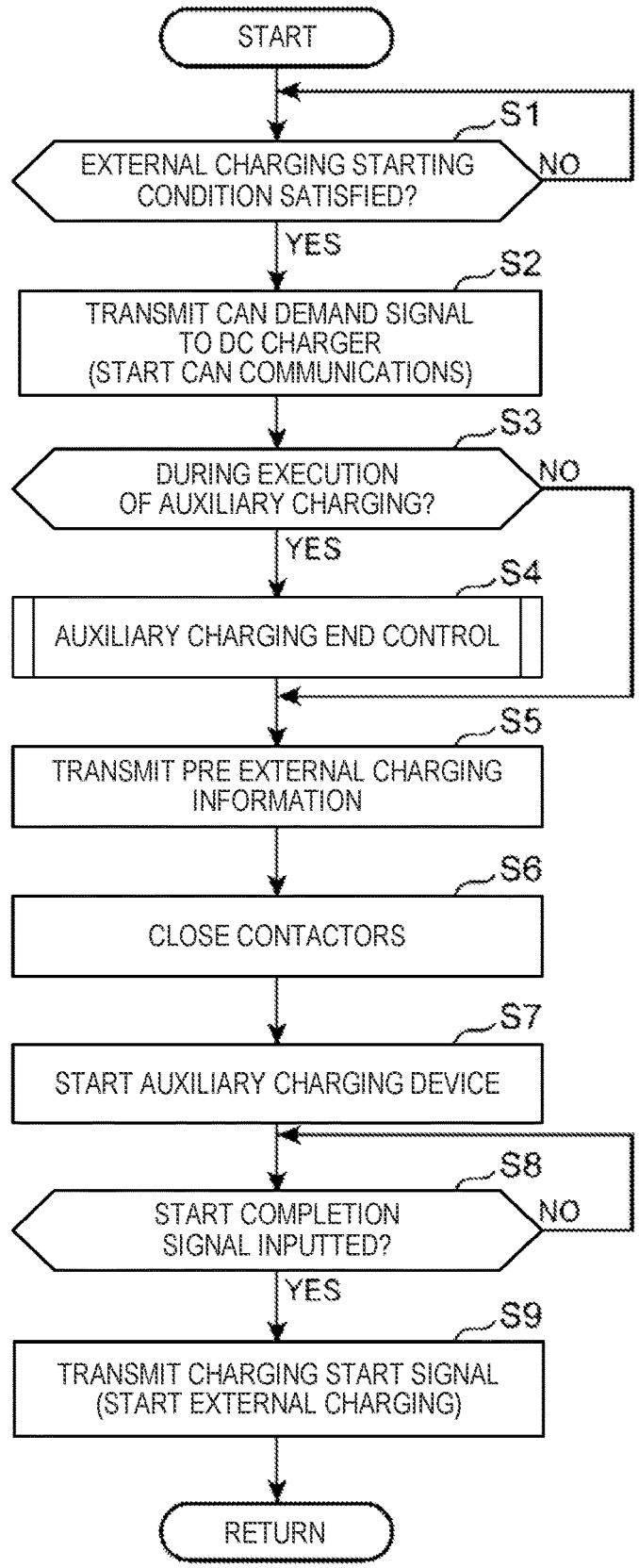
FIG. 4 is a flowchart illustrating a flow of a control when starting external charging.
Figure 5:
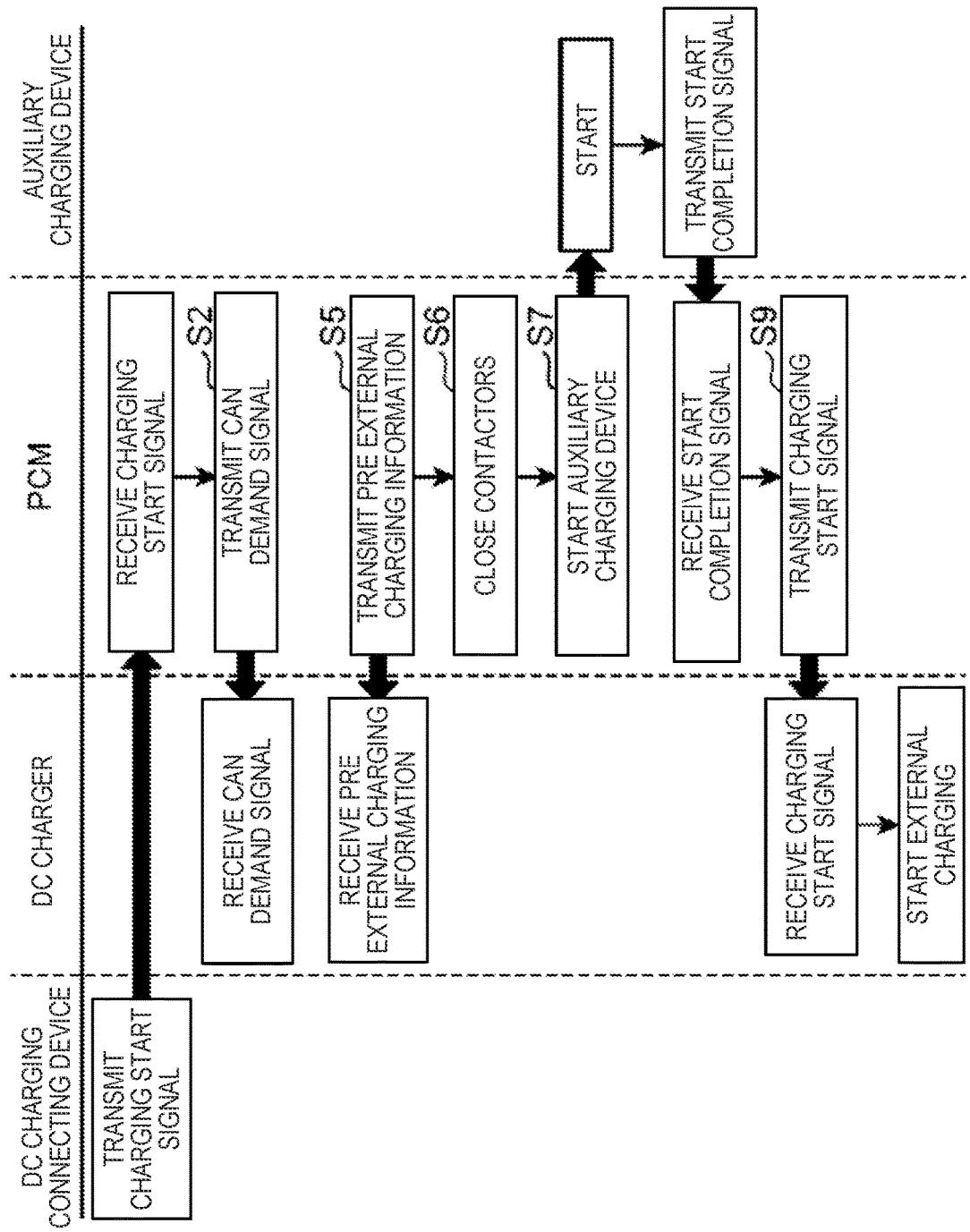
FIG. 5 is a view illustrating a control content of each controller when starting the external charging in a state where auxiliary charging is not carried out.

A control carried out when starting the external charging is described with reference to FIGS. 4 and 5. FIG. 4 is a flowchart illustrating a procedure of the control carried out by the PCM 201. FIG. 5 is a view illustrating a control content of each controller when starting the external charging in a state where the auxiliary charging is not carried out.

As illustrated in FIG. 4, the PCM 201 first determines whether the external charging starting condition is satisfied (Step S1). As illustrated in FIG. 5, the PCM 201 determines that the external charging starting condition is satisfied when a charging start signal is received from the DC charging connection device 50. The charging start signal is transmitted to the PCM 201 from the DC charging connection device 50 when the DC charging connection device 50 fits with the DC connector.

If determined that the external charging starting condition is satisfied (if the determination at Step S1 is YES), the PCM 201 generates a CAN demand signal which is a signal for realizing the CAN communications with the DC charger 312, and transmits it to the DC charger 312, in order to start the CAN communications with the DC charger 312 (Step S2). As illustrated in FIG. 5, when the CAN demand signal is transmitted to the DC charger 312 from the PCM 201, the DC charger 312 receives it. Therefore, between the PCM 201 and the DC charger 312, the CAN communications through the C-BCM 200 and the DC charging connection device 50 are started. If the determination at Step S1 is NO, the processing returns and repeats until the external charging starting condition is satisfied.

Further, if the auxiliary charging is carried out when the external charging starting condition is satisfied, i.e., if the external charging starting condition is satisfied during the execution of the auxiliary charging (if determination at Step S3 is YES), the PCM 201 determines that the auxiliary charging ending condition is satisfied and carries out the auxiliary charging end control so that the auxiliary charging is ended and an auxiliary charging post stop processing is performed (Step S4), as will be described later.

On the other hand, if the auxiliary charging is not carried out when the external charging starting condition is satisfied, i.e., if the external charging starting condition is satisfied in a state where the auxiliary charging is not carried out (if the determination at Step S3 is NO), or after ending the auxiliary charging end control, the PCM 201 transmits pre external charging information which is information for carrying out the external charging more appropriately to the DC charger 312 by the CAN communications (Step S5).

In detail, the PCM 201 calculates a maximum charging time which is the maximum value of time required for fully charging the high-voltage battery 2, based on the battery SOC and the detection values of the battery current sensor SN1 and the battery temperature sensor SN2 received from the BECM 205. Then, the information on the maximum charging time, the temperature of the high-voltage battery 2, etc. are transmitted to the DC charger 312. When received the pre-external charging information, the DC charger 312 adjusts power outputted to the high-voltage battery 2 based on the information. For example, when the maximum charging time passes after the power output is started, the power output is stopped, and when the temperature of the high-voltage battery 2 detected by the battery temperature sensor SN2 is high, the output current is reduced.

After Step S5, the PCM 201 closes each contactor (Step S6). In detail, the PCM 201 closes the main contactors 71 and the OBC contactors 73. Therefore, the high-voltage battery 2 is electrically connected with the high-voltage circuit 30, and the high-voltage battery 2 is electrically connected with the DC charger 312 via the high-voltage circuit 30.

Here, the external charging is carried out while the vehicle is stopped, and when the vehicle is stopped and the auxiliary charging is not carried out, the contactors 71 and 73 are opened. Further, also when the auxiliary charging is carried out, the contactors 71 and 73 are opened in connection with execution of the auxiliary charging end control as will be described later. Thus, the contactors 71 and 73, which are opened, are closed at Step S6.

In the vehicle 1 of the first embodiment, the auxiliary charging is carried out during execution of the external charging. Therefore, after Step S6, the PCM 201 starts the auxiliary charging device 20 to start the operation (Step S7). In detail, the PCM 201 starts the power supply to the DC-DC converter 8 from the low-voltage battery 3 to start the DC-DC converter 8 so that the power is inputted into the DC-DC converter 8. Further, the PCM 201 starts the power supply from the low-voltage battery 3 to the DC/DC control unit 207 to start the DC/DC control unit 207.

As illustrated in FIG. 5, when the starting of the auxiliary charging device 20 is completed, a start completion signal is transmitted to the PCM 201 from the auxiliary charging device 20. If the start completion signal is inputted (waiting for determination at Step S8 becoming YES), the PCM 201 carries out the following Step S9.

At Step S9, the PCM 201 issues a command for starting the external charging to the DC charger 312 to start the external charging (permits the power output from the DC power unit 310 to the vehicle 1). In detail, as illustrated in FIG. 5, the PCM 201 transmits the charging start signal to the DC charger 312. When the charging start signal is received from the PCM 201, the DC charger 312 starts the power supply from the DC power unit 310 to the high-voltage battery 2.

(Auxiliary Charging End Control)

Figure 6:
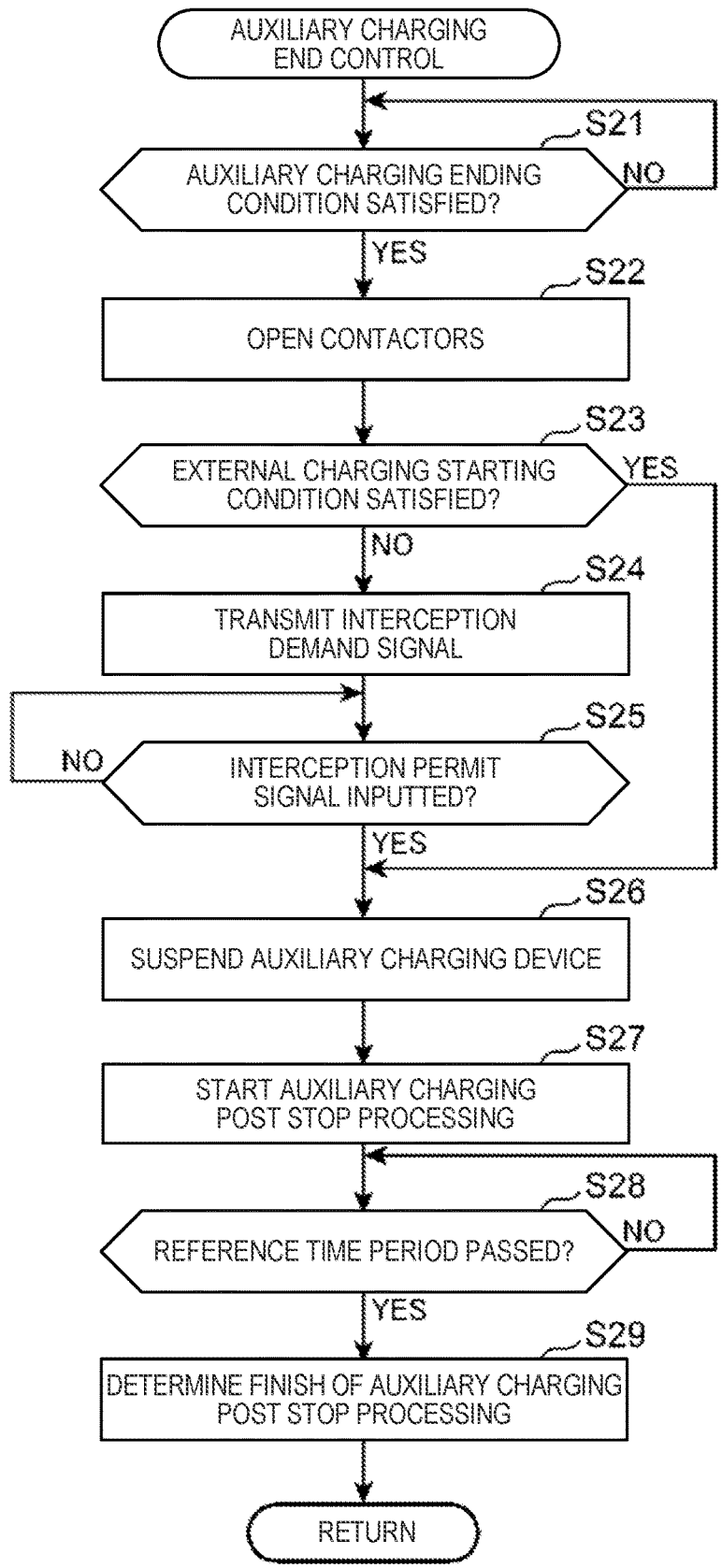
FIG. 6 is a flowchart illustrating a flow of a control when ending the auxiliary charging.
Figure 7:
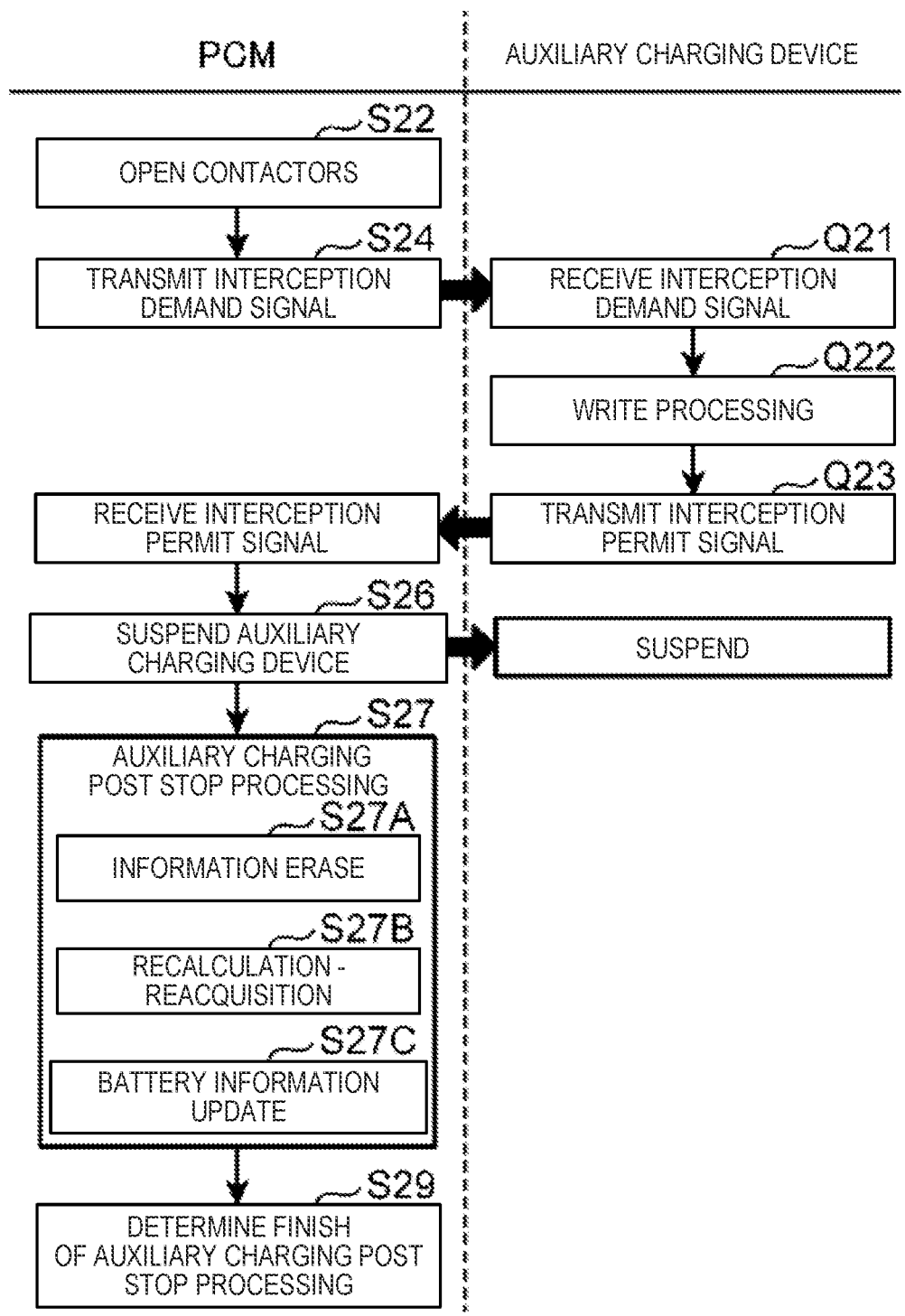
FIG. 7 is a view illustrating a control content of each controller when ending the auxiliary charging in a state where an external charging starting condition is not satisfied.

Next, a control carried out when ending the auxiliary charging is described with reference to FIGS. 6 and 7. FIG. 6 is a flowchart illustrating a procedure of the control carried out by the PCM 201. FIG. 7 is a view illustrating a control content of each controller when ending the auxiliary charging in a state where the external charging starting condition is not satisfied.

The PCM 201 first determines whether the auxiliary charging ending condition is satisfied (Step S21).

In the first embodiment, if the external charging starting condition is satisfied during the execution of the auxiliary charging, the auxiliary charging is ended. Thus, if the external charging starting condition is satisfied during the execution of the auxiliary charging, the PCM 201 determines that the auxiliary charging ending condition is satisfied. Further, after the auxiliary charging is started, if the low-voltage battery 3 is fully charged, a demand for driving the PTC heater 9 is issued, or a demand for driving the battery heater is issued, the PCM 201 determines that the auxiliary charging ending condition is satisfied. The conditions, such as that the low voltage battery 3 is fully charged, the demand for driving the PTC heater 9 is issued, and the demand for driving the battery heater is issued, are examples of "other given conditions" of the present disclosure.

If determined that the auxiliary charging ending condition is satisfied (if the determination at Step S21 becomes YES), the PCM 201 opens the main contactors 71 (Step S22). That is, the main contactors 71 are closed during the execution of the auxiliary charging, and at Step S22, the main contactors 71 are switched from the closed state to the open state.

Next, the PCM 201 determines whether the external charging starting condition is satisfied (Step S23). That is, it determines whether the auxiliary charging ending condition is satisfied in connection with the establishment of the external charging starting condition.

If the external charging starting condition is not satisfied (if the determination at Step S23 is NO), the PCM 201 transmits an interception demand signal to the auxiliary charging device 20 in order to stop the auxiliary charging device 20 (Step S24).

As illustrated in FIG. 7, if the interception demand signal is received (Step Q21), the auxiliary charging device 20 carries out a write processing to write and store in the nonvolatile memory 207C the information on the auxiliary charging device 20 stored in the volatile memory 207B (Step Q22).

For example, the CPU 207A of the auxiliary charging device 20 determines whether each part of the auxiliary charging device 20, such as the DC-DC converter 8, is failed while the vehicle 1 is traveling, or while the auxiliary charging is carried out and the auxiliary charging device 20 is operating (while receiving the power supply), and stores the determination result in the volatile memory 207B. If the interception demand signal is received from the PCM 201, the CPU 207A of the auxiliary charging device 20 writes in the nonvolatile memory 207C information on the auxiliary charging device 20 including the above-described determination result stored in the volatile memory 207B.

After the write processing is finished, the auxiliary charging device 20 (the CPU 207A) transmits an interception permit signal for permitting the suspension of the auxiliary charging device 20 to the PCM 201 (Step Q23).

Returning to FIG. 6, if the interception permit signal is inputted from the auxiliary charging device 20 (waiting for determination at Step S25 becoming YES), the PCM 201 shifts to the following Step S26.

At Step S26, the PCM 201 suspends the auxiliary charging device 20. In detail, the PCM 201 stops the power supply from the low-voltage battery 3 to the auxiliary charging device 20 (the DC/DC control unit 207 and the DC-DC converter 8).

On the other hand, if the determination at Step S23 is YES and the auxiliary charging is to be ended in connection with the establishment of the external charging starting condition, the PCM 201 shifts to Step S26 without carrying out Steps S24 and S25 to suspend the auxiliary charging device 20.

Thus, when ending the auxiliary charging in connection with the establishment of the external charging starting condition, the above-described write processing in the auxiliary charging device 20 and the communications of the signals between the PCM 201 and the auxiliary charging device 20 are omitted.

After Step S26, the PCM 201 starts the auxiliary charging post stop processing (Step S27).

The auxiliary charging post stop processing includes processing for resetting a part of the PCM 201. That is, as illustrated in FIG. 7, the auxiliary charging post stop processing includes information erase processing for erasing a part of information (signal) generated by the calculation of the PCM 201 itself, and information (signals) acquired from other controllers (Step S27A), and recalculation and reacquisition processing (update processing) for recalculating (regenerating) or reacquiring and updating at least a part of the erased information (Step S27B).

The PCM 201 performs at least the following two processings as the reset processing:

(1) The PCM 201 erases the information (signal) outputted to the CAN communication apparatus in order to realize the CAN communications, stops the CAN communications with the CAN communication apparatus which performed the CAN communications, and then recalculates (regenerates) the information (signal) for realizing the CAN communications and transmits it to the CAN communication apparatus to perform processing for resuming the CAN communications with the CAN communication apparatus; and (2) The PCM 201 erases determination result stored until now, which is a result of an abnormality determination of a main contactor forcible open system carried out last time, and then performs processing for again carrying out the abnormality determination.

The abnormality determination of the main contactor forcible open system will be described later in detail.

Further, the auxiliary charging post stop processing includes battery information update processing for updating information on the high-voltage battery 2 stored in the PCM 201 (Step S27C). In detail, the PCM 201 requests to the BECM 205 a transmission of the latest battery SOC and the latest detection values of the battery current sensor SN1 and the battery temperature sensor SN2, receives the information from the BECM 205, and updates the information stored until now.

Here, at Step S22, the main contactors 71 are switched from the closed state to the open state. Thus, after Step S22, the BECM 205 performs the calculation and the update of the initial value of the battery SOC based on the detection values of the battery current sensor SN1 and the battery temperature sensor SN2, and by the execution of the auxiliary charging post stop processing, the battery SOC updated by the BECM 205 (i.e., the latest battery SOC) is transmitted to the PCM 201.

The abnormality determination of the main contactor forcible open system is described with reference to FIG. 8.

Figure 8:
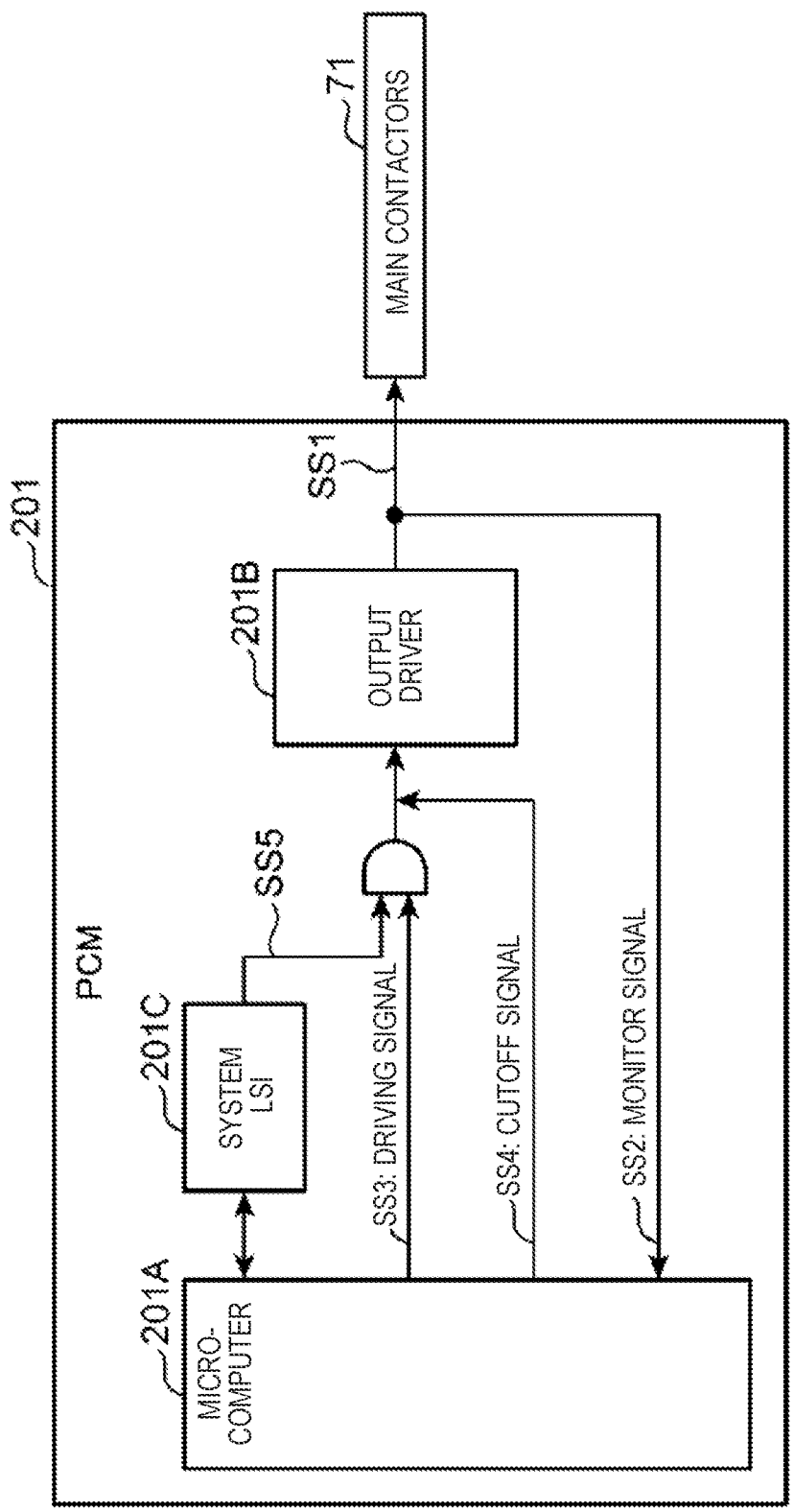
FIG. 8 is a block diagram illustrating a main contactor forcible open system.

As illustrated in FIG. 8, the PCM 201 includes a microcomputer 201A (including a CPU, memory, etc.) and a system LSI 201C for monitoring the microcomputer 201A. From the system LSI 201C, a signal SS5 of whether the microcomputer 201A is normal is outputted. The PCM 201 has an output driver 201B which generates an output signal SS1 to the main contactors 71. The main contactors 71 are opened and closed according to the output signal SS1 from the output driver 201B. The output signal SS1 of the output driver 201B is inputted into the microcomputer 201A as a monitor signal SS2 so that the microcomputer 201A is able to monitor the output signal SS1 of the output driver 201B. Further, in addition to a normal driving signal SS3 for opening and closing the main contactors 71, a cutoff signal SS4 for opening the main contactors 71 is outputted from the microcomputer 201A.

When the signal indicating that the microcomputer 201A is normal is outputted from the system LSI 201C, and the cutoff signal SS4 is not outputted from the microcomputer 201A, the output driver 201B outputs the driving signal SS3. Therefore, in this case, the main contactors 71 are opened and closed according to the driving signal SS3. On the other hand, when the signal indicating that the microcomputer 201A is abnormal is outputted from the system LSI 201C (or when the signal indicating that the microcomputer 201A is normal is not outputted), or when the cutoff signal SS4 is outputted from the microcomputer 201A, the output driver 201B outputs to the main contactors 71 a signal for forcibly opening the main contactors 71, regardless of the driving signal SS3. Thus, in this case, the main contactors 71 are forcibly opened, regardless of the driving signal SS3.

The abnormality determination of the main contactor forcible open system is processing for determining whether the main contactors 71 can be forcibly opened by the signal output from the system LSI 201C and the output of the cutoff signal SS4, that is, whether a command for forcibly opening the main contactors 71 can be outputted correctly to the main contactors 71 from the output driver 201B. This determination is carried out for each of the system LSI 201C and the cutoff signal SS4. Below, a signal for opening the main contactors 71 is referred to as an "open signal," and a signal for closing the main contactors 71 is referred to as a "close signal."

As a concrete procedure of the abnormality determination for the system LSI 201C, the PCM 201 first sets the driving signal SS3 to the open signal, and sets the output signal SS5 of the system LSI 201C to a signal when the microcomputer 201A is abnormal. Note that, at Step S22, the main contactors 71 are opened. That is, the driving signal SS3 has already been the open signal, and this signal is maintained. Further, the PCM 201 suspends the output of the cutoff signal SS4.

Next, the PCM 201 sets the driving signal SS3 to the close signal, while maintaining the output signal SS5 of the system LSI 201C as the signal when the microcomputer 201A is abnormal.

At this time, when the signal when the microcomputer 201A is abnormal is appropriately outputted from the system LSI 201C, the signal outputted from the output driver 201B is still the open signal, even when the driving signal SS3 is changed from the open signal to the close signal. On the other hand, when the signal when the microcomputer 201A is abnormal is not appropriately outputted from the system LSI 201C, the output signal SS1 of the output driver 201B is changed to the close signal by the driving signal SS3 being changed from the open signal to the close signal. Thus, the PCM 201 determines whether the monitor signal SS2 is changed from the open signal to the close signal in connection with the change of the driving signal SS3 to the close signal, and when the monitor signal SS2 is changed, it determines that the signal when the microcomputer 201A is abnormal is not appropriately outputted from the system LSI 201C, and that the command for forcibly opening the main contactors 71 is not outputted correctly from the system LSI 201C to the main contactors 71. On the other hand, when the monitor signal SS2 is not changed in connection with the change of the driving signal SS3 to the close signal the PCM 201 determines that the command is outputted correctly.

As a concrete determination procedure for the cutoff signal SS4, first, the PCM 201 sets the driving signal SS3 to the open signal (maintains it as the open signal), and outputs the cutoff signal SS4. Note that, at this time, the system LSI 201C is set to output the signal when the microcomputer 201A is normal. Next, the PCM 201 changes the driving signal SS3 into the close signal, while maintaining the output of the cutoff signal SS4.

At this time, when the cutoff signal SS4 is appropriately outputted, the signal outputted from the output driver 201B stays being the open signal, even when the driving signal SS3 is changed from the open signal to the close signal. On the other hand, when the cutoff signal SS4 is not outputted appropriately, the signal outputted from the output driver 201B is changed to the close signal by the driving signal SS3 being changed from the open signal to the close signal. Thus, the PCM 201 determines whether the monitor signal SS2 is changed from the open signal to the close signal in connection with the change of the driving signal SS3 to the close signal, and when the monitor signal SS2 is changed, it determines that the cutoff signal SS4 is not outputted appropriately (i.e., the command for forcibly opening the main contactors 71 is not outputted correctly to the main contactors 71). On the other hand, when the monitor signal SS2 is not changed from the open signal, it determines that the command is outputted correctly.

Returning to the flowchart of FIG. 6, after the auxiliary charging post stop processing is started, the PCM 201 determines whether a given reference period of time has passed since the auxiliary charging post stop processing is started (Step S28). This reference period of time is set as a period of time more than the time required for the auxiliary charging post stop processing, and all the auxiliary charging post stop processing would be ended at the timing when the determination at Step S28 becomes YES. Thus, if the determination at Step S28 becomes YES, the PCM 201 determines that the auxiliary charging post stop processing is finished (Step S29), and ends the auxiliary charging end control. Note that the reference period of time is set beforehand by an experiment etc. and is stored in the PCM 201.

Figure 9:
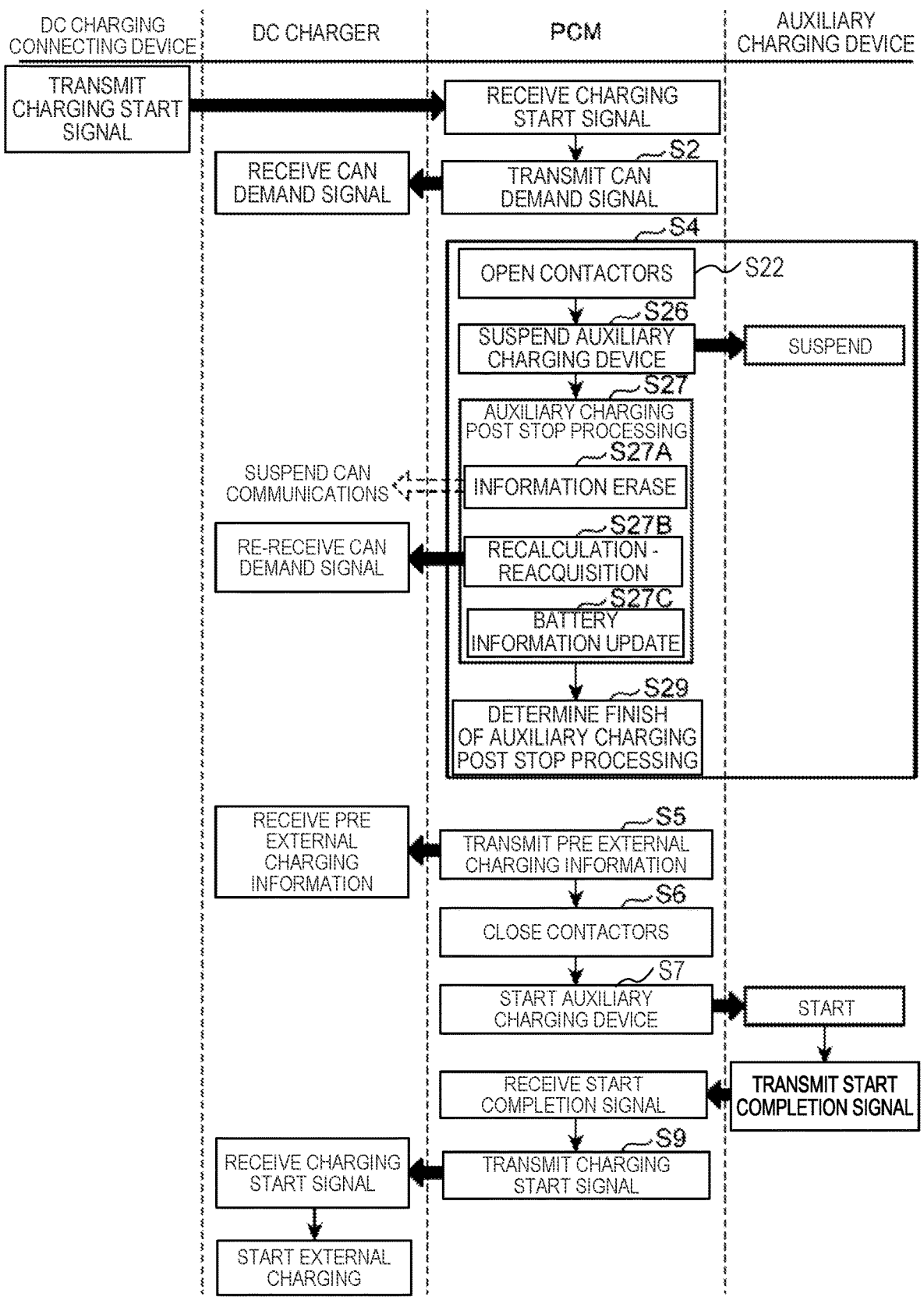
FIG. 9 is a view illustrating a control content of each controller when the external charging starting condition is satisfied during the execution of the auxiliary charging.

Next, a control content of each controller, when the external charging starting condition is satisfied during the execution of the auxiliary charging, and in connection with this, the auxiliary charging ending condition is satisfied, is described with reference to FIG. 9.

Also when the auxiliary charging is carried out, in response to the reception of the charging start signal from the DC charging connection device 50, the PCM 201 determines that the external charging starting condition is satisfied, generates the CAN demand signal, and transmits it to the DC charger 312, similarly to the case where the auxiliary charging is not carried out (Step S2).

On the other hand, when the auxiliary charging is carried out while the external charging starting condition is satisfied, the PCM 201 starts the auxiliary charging end control, unlike the case where the auxiliary charging is not carried out (Step S4).

The PCM 201 first opens the main contactors 71, similarly to the normal auxiliary charging ending (upon the establishment of the auxiliary charging ending condition without the establishment of the external charging starting condition) (Step S22). On the other hand, when the auxiliary charging ending condition is satisfied in connection with the establishment of the external charging starting condition, the above-described write processing of the auxiliary charging device 20 and the communications of the signal between the PCM 201 and the auxiliary charging device 20 are omitted. Thus, after the main contactors 71 are opened, the PCM 201 suspends the auxiliary charging device 20 (Step S26).

Next, the PCM 201 starts the auxiliary charging post stop processing (Step S27). At this time, the CAN demand signal transmitted to the DC charger 312 from the PCM 201 is erased by the execution of the information erase processing (Step 27A), and then, the CAN demand signal is regenerated by the execution of the recalculation and reacquisition processing 27B (Step S27B), and is retransmitted to the DC charger 312. Therefore, when the auxiliary charging ending condition is satisfied in connection with the establishment of the external charging starting condition, the CAN communications between the PCM 201 and the DC charger 312 are suspended temporarily. Then, the CAN communications between the PCM 201 and the DC charger 312 are resumed by the CAN demand signal being regenerated and retransmitted from the PCM 201, and the DC charger 312 re-receiving this CAN demand signal.

Further, after the PCM 201 suspends the auxiliary charging device 20, it carries out the battery information update processing (Step S27C) which is a part of the auxiliary charging post stop processing to update the information on the high-voltage battery 2.

Further, similarly to the case where the external charging starting condition is not satisfied, when the reference period of time passes after the auxiliary charging post stop processing is started, the PCM 201 determines that the auxiliary charging post stop processing is finished (Step S29), and ends the auxiliary charging end control.

A control after the auxiliary charging end control is finished (after the determination of the control being ended) is similar to the control for starting the external charging when the external charging starting condition is satisfied in the state where the auxiliary charging is not carried out, and the PCM 201 carries out Steps S5-S9. That is, the PCM 201 transmits the pre external charging information to the DC charger 312 by the CAN communications (Step S5), closes the main contactors 71 and the OBC contactors 73 (Step S6), starts the auxiliary charging device 20 (Step S7), and waits for the input of the start completion signal from the auxiliary charging device 20 (waits for the determination at Step S8 becoming YES), and then transmits the charging start signal to the DC charger 312 to start the external charging (Step S9).

Here, the information erase processing at Step S27A is an example of an "information erase control" of the present disclosure, and the recalculation and reacquisition processing at Step S27B is an example of an "update control" of the present disclosure. Further, the above-described auxiliary charging post stop processing (Step S27) is an example of an "auxiliary charging post stop control" of the present disclosure.

(Operation, etc. of First Embodiment)

As described above, in the first embodiment, the auxiliary charging for charging the low-voltage battery 3 by the high-voltage battery 2, and the external charging for charging the high-voltage battery 2 by the power unit 310 outside the vehicle 1 are realized. Therefore, the charged amounts of both the high-voltage battery 2 and the low-voltage battery 3 can be secured.

Further, when the external charging starting condition is satisfied during the execution of the auxiliary charging, the charging start signal is transmitted to the DC charger 312 to start the external charging after the auxiliary charging end control including the control for suspending the auxiliary charging device 20 is ended. Therefore, it can be avoided that the control for carrying out the auxiliary charging interferes with the control for starting the external charging, and the external charging can be started appropriately.

In addition, when the auxiliary charging ending condition is established in the state where the external charging starting condition is not satisfied, the write processing is carried out, and the information on the auxiliary charging device 20, such as the determination result of the failure determination of the auxiliary charging device 20, is written and stored in the nonvolatile memory 207C from the volatile memory 207B. Therefore, even after the auxiliary charging device 20 is suspended and the auxiliary charging is ended, the information on the auxiliary charging device 20 can be continuously held by the auxiliary charging device 20.

On the other hand, when the auxiliary charging ending condition is satisfied in connection with the establishment of the external charging starting condition, the write processing is omitted. Therefore, the write processing itself and the communications of the signal between the PCM 201 and the auxiliary charging device 20 for performing the write processing (transmission and reception of the interception demand signal and the interception permitting signal) taking time can be avoided, and the time until the external charging is started after the external charging starting condition is satisfied can be shortened to start the external charging earlier. Therefore, a user feeling odd because the external charging has not been started over a comparatively long period of time after the user carried out an operation for starting the external charging to the DC power unit 310 can be prevented.

Further, in the first embodiment, when the auxiliary charging ending condition is satisfied, the auxiliary charging post stop processing (Step S27) is carried out, and the information erase processing (Step S27A) and the recalculation and reacquisition processing (Step S27B) are carried out. Therefore, by utilizing the timing at which the auxiliary charging is ended, a part of the PCM 201 can be reset and the information held by the PCM 201 can be updated to the latest information.

Especially, in the first embodiment, as the auxiliary charging post stop processing, the information (signal) for realizing the CAN communications, which is outputted to the CAN communication apparatus which carries out the CAN communications with the PCM 201, is erased and the CAN communications between the PCM 201 and the CAN communication apparatus are stopped. Then, the PCM 201 is caused to recalculate (regenerate) and retransmit the information (signal) for realizing the CAN communications to resume the CAN communications. Therefore, the suitable CAN communications between the PCM 201 and the CAN communication apparatus can be established by utilizing the timing at which the auxiliary charging is ended.

Further, in the first embodiment, as the auxiliary charging post stop processing, the abnormality determination result of the main contactor forcible open system stored in the PCM 201 is erased, and the abnormality determination is again performed after that. Therefore, the opportunity for executing the abnormality determination of the main contactor forcible open system can be secured.

Further, in the first embodiment, as the auxiliary charging post stop processing, the latest battery SOC and the latest detection values of the battery current sensor SN1 and the battery temperature sensor SN2 are transmitted to the PCM 201 from the BECM 205. Therefore, the subsequent controls using the information can be performed appropriately by the PCM 201. In the first embodiment, as described above, these latest values are transmitted to the DC charger 312 as the pre-external charging information, and the power outputted to the high-voltage battery 2 is adjusted based on the information. Therefore, the high-voltage battery 2 can be charged more appropriately.

Here, in the first embodiment, also when the auxiliary charging ending condition is satisfied in connection with the establishment of the external charging starting condition, the auxiliary charging post stop processing is carried out, and after the completion of the auxiliary charging post stop processing, the external charging is started. Therefore, the start time of the external charging becomes later because of the auxiliary charging post stop processing. However, as described above, in the first embodiment, when the external charging starting condition is satisfied during the execution of the auxiliary charging, the delay of the start time of the external charging is suppressed by omitting the write processing. Therefore, also when the auxiliary charging ending condition is satisfied in connection with the establishment of the external charging starting condition, by carrying out the auxiliary charging post stop processing, and starting the external charging after the finish of the auxiliary charging post stop processing, the above-described effects acquired by executing the auxiliary charging post stop processing can be acquired, while avoiding that the start time of the external charging becomes excessively late, and it can be prevented that the auxiliary charging post stop processing interferes with the control for starting the external charging.

Further, in the first embodiment, when the reference period of time passes after the auxiliary charging device 20 is suspended, it is determined that the auxiliary charging post stop processing is finished. Therefore, the external charging can be started after the auxiliary charging post stop processing is finished certainly, and it can be certainly prevented that the auxiliary charging post stop processing interferes with the control for starting the external charging.

Further, in the first embodiment, when the external charging starting condition is satisfied, the main contactors 71 are closed and the auxiliary charging device 20 is started to start the auxiliary charging. That is, the auxiliary charging is carried out also during the execution of the external charging. Therefore, more charged amounts of both the high-voltage battery 2 and the low-voltage battery 3 can be secured.

Further, in the first embodiment, when the external charging starting condition is satisfied during the execution of the auxiliary charging and the auxiliary charging ending condition is satisfied in connection with this, after the main contactors 71 are opened by the execution of the auxiliary charging end control and the auxiliary charging device 20 is suspended, the main contactors 71 are closed and the auxiliary charging device 20 is started. Therefore, it can be prevented that the control for opening the main contactors 71 and suspending the auxiliary charging device 20, which is carried out in connection with the end of the auxiliary charging interferes with the control for closing the main contactors 71 and starting the auxiliary charging device 20 in connection with the start of the external charging.

Second Embodiment

Figure 10:
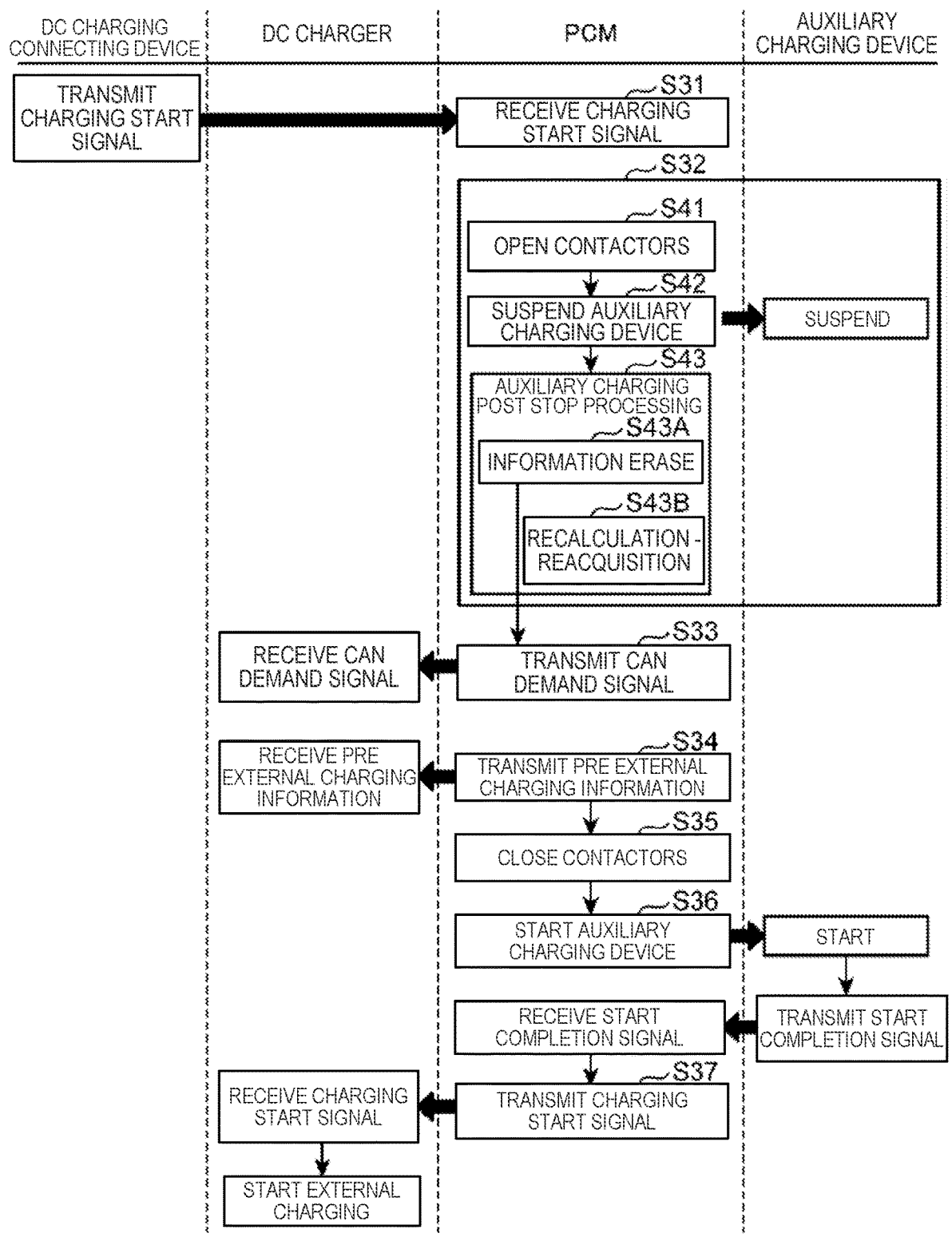
FIG. 10 is a view illustrating a control content of each controller when the external charging starting condition is satisfied during the execution of the auxiliary charging, according to a second embodiment.

In the first embodiment, when the external charging starting condition is satisfied during the execution of the auxiliary charging and the auxiliary charging ending condition is satisfied in connection with this, the CAN demand signal is once generated and transmitted to the DC charger 312 before the execution of the information erase processing. However, the CAN demand signal may be generated and transmitted to the DC charger 312 for the first time after the finish of the information erase processing. A battery charging control device for the vehicle according to a second embodiment configured in this way is described with reference to FIG. 10. Note that configurations of the second embodiment which will not be described below are the same as those of the first embodiment.

Also in the second embodiment, similarly to the first embodiment, when the charging start signal is received from the DC charging connection device 50 (Step S31), the PCM 201 determines that the external charging starting condition is satisfied. However, in the second embodiment, the PCM 201 does not immediately perform the generation and the transmission of the CAN demand signal to the DC charger 312, but, first starts the auxiliary charging end control (Step S32).

Similarly to the first embodiment, the PCM 201 first opens the main contactors 71 (Step S41). Next, it suspends the auxiliary charging device 20 (Step S42). Next, the PCM 201 starts the auxiliary charging post stop processing (Step S43).

However, unlike the first embodiment, in the second embodiment, the PCM 201 does not carry out the battery information update processing, but only carries out the information erase processing (Step S43A) and the recalculation and reacquisition processing (Step S43B).

Further, when the information erase processing (Step S43A) is finished, the PCM 201 performs the recalculation and reacquisition processing (Step S43B), and performs the generation and transmission of the CAN demand signal to the DC charger 312 (Step S33). That is, the PCM 201 does not wait for the completion of the recalculation and reacquisition of the information (signal), such as the abnormality determination result of the main contactor forcible open system, which is erased by the information erase processing, but, first generates the CAN demand signal for realizing the CAN communications with the DC charger 312, and then transmits it to the DC charger 312 to start the CAN communications with the DC charger 312. After that, the PCM 201 carries out a similar control to Steps S5, S6, S7, and S9 in the first embodiment to start the external charging. That is, the PCM 201 transmits the pre external charging information to the DC charger 312 by the CAN communications (Step S34), closes the contactors 71 and 73 (Step S35), starts the auxiliary charging device 20 (Step S36), waits for the input of the start completion signal from the auxiliary charging device 20, and transmits the charging start signal to the DC charger 312 (Step S37) to cause the DC charger 312 to start the external charging. Note that, since the battery update processing is omitted as described above, the PCM 201 transmits the information already stored as the pre-external charging information to the DC charger 312.

(Operation, etc. of Second Embodiment)

As described above, in the second embodiment, the generation and transmission of the CAN demand signal to the DC charger 312 from the PCM 201 are performed for the first time after the finish of the information erase processing. In a case where the generation and transmission of the CAN demand signal to the DC charger 312 are performed before the execution of the information erase processing, this CAN demand signal is erased by the execution of the information erase processing, and therefore, it takes time because the CAN demand signal must be regenerated and retransmitted. On the other hand, according to the second embodiment, since it becomes unnecessary to regenerate and retransmit the CAN demand signal, the time for the regeneration and retransmission can be omitted. Therefore, the period of time after the establishment of the external charging starting condition until the start of the external charging can be shortened more. In the second embodiment, without waiting for the finish of the update processing, the CAN communications between the PCM 201 and the DC charger 312 are started, and the subsequent controls required for starting the external charging are carried out (Steps S33-S37). Further, the battery information update processing is omitted. Therefore, the time until the external charging is started can be further shortened. Note that the operation and effects obtained by the same configuration as the first embodiment can also be obtained in the second embodiment.

(Modifications)

Although in the first and second embodiments the power unit outside the vehicle which supplies the power to the high-voltage battery 2 outputs direct current, the power unit outside the vehicle may output alternate current.

Further, although in the above embodiments both the volatile memory 207B and the nonvolatile memory 207C are provided to the auxiliary charging device 20, the volatile memory 207B and the nonvolatile memory 207C may be provided to other controllers (for example, the PCM 201). Moreover, the device which performs the write processing is not limited to the CPU 207A of the auxiliary charging device 20.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 High-voltage Battery
3 Low-voltage Battery
4 Motor
8 DC-DC Converter
20 Auxiliary Charging Device
30 High-voltage Circuit
50 DC Charging Connection Device
71 Main Contactor
201 PCM (Control Device)
201B Output Driver
207A CPU (Write Processing Device)
207B Volatile Memory (Temporary Storage Device)
207C Nonvolatile Memory (Storage Device)
310 DC Power Unit (Power Unit)
312 DC Charger (Charger)

What is claimed is:

1. A battery charging control device for a vehicle, comprising:
   a motor as a driving source;
   a high-voltage battery configured to supply power to the motor;
   a low-voltage battery of which an output voltage is lower than the high-voltage battery;
   a charging connection device configured to realize external charging for charging the high-voltage battery by a power unit having a charger provided outside the vehicle, by being connected with the power unit;
   an auxiliary charging device configured to carry out auxiliary charging for charging the low-voltage battery by output power of the high-voltage battery;
   a temporary storage device configured to store information on the auxiliary charging device only during operation of the auxiliary charging device;
   a storage device configured to store the information on the auxiliary charging device both during operation and suspension of the auxiliary charging device;
   a write processing device configured to carry out write processing for writing and storing in the storage device the information stored in the temporary storage device; and
   a control device configured to control the auxiliary charging device and the write processing device, the control device including a processor configured to execute:
      a determination module to determine whether an external charging starting condition that is a condition for starting the external charging is satisfied, and when the external charging starting condition is satisfied or other given conditions are satisfied during execution of the auxiliary charging, determine that an auxiliary charging ending condition that is a condition for ending the auxiliary charging is satisfied; and
      a charging control module to suspend the auxiliary charging device after causing the write processing device to carry out the write processing, when the auxiliary charging ending condition is satisfied in a state where the external charging starting condition is not satisfied, and issue a command for starting the external charging to the charger after suspending the auxiliary charging device and inhibit the write processing by the write processing device, when the auxiliary charging ending condition is satisfied in connection with the establishment of the external charging starting condition.

2. The battery charging control device of claim 1,
   wherein the charging control module carries out an auxiliary charging post stop control for erasing and updating information held by the control device after the suspension of the auxiliary charging device, when the auxiliary charging ending condition is satisfied, and
   wherein the charging control module issues a command for causing the charger to start the external charging after the finish of the auxiliary charging post stop control, when the external charging starting condition is satisfied during the execution of the auxiliary charging.

3. The battery charging control device of claim 2, further comprising:
   a main contactor configured to engage and disengage an electric connection between a high-voltage circuit including the low-voltage battery and the high-voltage battery; and
   an output driver configured to output to the main contactor a forcible open command that is a command for forcibly opening the main contactor,
   wherein the charging control module determines whether the forcible open command is outputted from the output driver during the execution of the auxiliary charging post stop control.

4. The battery charging control device of claim 2, further comprising a main contactor configured to engage and disengage an electric connection between a high-voltage circuit including the low-voltage battery and the high-voltage battery,
   wherein the charging control module opens the main contactor, when the auxiliary charging ending condition is satisfied,
   wherein the charging control module closes the main contactor and starts the auxiliary charging device to start the auxiliary charging, when the external charging starting condition is satisfied, and
   wherein the charging control module closes the main contactor and starts the auxiliary charging device, after opening the main contactor and suspending the auxiliary charging device, when the external charging starting condition is satisfied during the execution of the auxiliary charging.

5. The battery charging control device of claim 4, further comprising a state of charge (SOC) calculation device configured to calculate a battery SOC that is a SOC of the high-voltage battery,
   wherein the charging control module receives information on the latest battery SOC from the SOC calculation device during the execution of the auxiliary charging post stop control.

6. The battery charging control device of claim 5,
   wherein the charging control module determines that the auxiliary charging post stop control is finished, when a given reference period of time passes after the suspension of the auxiliary charging device, and
   wherein the charging control module issues a command for causing the charger to start the external charging after determining that the auxiliary charging post stop control is finished, when the external charging starting condition is satisfied during the execution of the auxiliary charging.

7. The battery charging control device of claim 1, further comprising a plurality of controller area network (CAN) communication apparatuses including the charger configured to be capable of CAN communications with the control device,
   wherein the charging control module carries out an information erase control for erasing information including signals for realizing the CAN communications between the control device and the CAN communication apparatuses after the suspension of the auxiliary charging device, when the auxiliary charging ending condition is satisfied, and carries out an update control for updating the erased information, and
   wherein the charging control module generates a signal for realizing the CAN communications between the control device and the charger and transmits the signal to the charger, and issues a command for causing the charger to start the external charging, after the information erase control is finished and before the update control is finished, when the external charging starting condition is satisfied during the execution of the auxiliary charging.

8. The battery charging control device of claim 2, further comprising a state of charge (SOC) calculation device configured to calculate a battery SOC that is a SOC of the high-voltage battery,
 wherein the charging control module receives information on the latest battery SOC from the SOC calculation device during the execution of the auxiliary charging post stop control.

9. The battery charging control device of claim 2,
 wherein the charging control module determines that the auxiliary charging post stop control is finished, when a given reference period of time passes after the suspension of the auxiliary charging device, and
 wherein the charging control module issues a command for causing the charger to start the external charging after determining that the auxiliary charging post stop control is finished, when the external charging starting condition is satisfied during the execution of the auxiliary charging.

10. The battery charging control device of claim 3, further comprising a state of charge (SOC) calculation device configured to calculate a battery SOC that is a SOC of the high-voltage battery,
 wherein the charging control module receives information on the latest battery SOC from the SOC calculation device during the execution of the auxiliary charging post stop control.

11. The battery charging control device of claim 3,
 wherein the charging control module determines that the auxiliary charging post stop control is finished, when a given reference period of time passes after the suspension of the auxiliary charging device, and
 wherein the charging control module issues a command for causing the charger to start the external charging after determining that the auxiliary charging post stop control is finished, when the external charging starting condition is satisfied during the execution of the auxiliary charging.

12. The battery charging control device of claim 4,
 wherein the charging control module determines that the auxiliary charging post stop control is finished, when a given reference period of time passes after the suspension of the auxiliary charging device, and
 wherein the charging control module issues a command for causing the charger to start the external charging after determining that the auxiliary charging post stop control is finished, when the external charging starting condition is satisfied during the execution of the auxiliary charging.

13. The battery charging control device of claim 8,
 wherein the charging control module determines that the auxiliary charging post stop control is finished, when a given reference period of time passes after the suspension of the auxiliary charging device, and
 wherein the charging control module issues a command for causing the charger to start the external charging after determining that the auxiliary charging post stop control is finished, when the external charging starting condition is satisfied during the execution of the auxiliary charging.

14. The battery charging control device of claim 10,
 wherein the charging control module determines that the auxiliary charging post stop control is finished, when a given reference period of time passes after the suspension of the auxiliary charging device, and
 wherein the charging control module issues a command for causing the charger to start the external charging after determining that the auxiliary charging post stop control is finished, when the external charging starting condition is satisfied during the execution of the auxiliary charging.

* * * * *